United States Patent
Park et al.

(10) Patent No.: US 11,330,020 B2
(45) Date of Patent: May 10, 2022

(54) METHOD FOR CONTROLLING CODEC ON BASIS OF CHANNEL CONDITIONS AND ELECTRONIC DEVICE

(71) Applicant: Samsung Electronics Co., Ltd., Suwon-si (KR)

(72) Inventors: Jinsub Park, Suwon-si (KR); Songkyu Kim, Suwon-si (KR); Yongwoon Moon, Suwon-si (KR); Kwangjae Woo, Suwon-si (KR); Insoo Lee, Suwon-si (KR); Junehee Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 5 days.

(21) Appl. No.: 16/978,350

(22) PCT Filed: Mar. 8, 2019

(86) PCT No.: PCT/KR2019/002748
§ 371 (c)(1),
(2) Date: Sep. 4, 2020

(87) PCT Pub. No.: WO2019/172717
PCT Pub. Date: Sep. 12, 2019

(65) Prior Publication Data
US 2021/0006603 A1    Jan. 7, 2021

(30) Foreign Application Priority Data

Mar. 8, 2018 (KR) .................. 10-2018-0027713

(51) Int. Cl.
*H04L 29/06* (2006.01)
*H04L 65/10* (2022.01)
(Continued)

(52) U.S. Cl.
CPC ...... *H04L 65/1006* (2013.01); *H04L 65/1069* (2013.01); *H04L 65/80* (2013.01); *H04N 21/2343* (2013.01); *H04N 21/643* (2013.01)

(58) Field of Classification Search
CPC . H04L 65/1006; H04L 65/1069; H04L 65/80; H04N 21/2343; H04N 21/643
(Continued)

(56) References Cited

U.S. PATENT DOCUMENTS 7,072,336 B2    7/2006 Barany et al.
7,742,768 B2    6/2010 Liu et al.
(Continued)

FOREIGN PATENT DOCUMENTS

| KR | 10-0906985 B1 | 7/2009 |
|----|---------------|--------|
| KR | 10-1167523 B1 | 7/2012 |
| KR | 10-1685442 B1 | 12/2016 |

*Primary Examiner* — Obaidul Huq
(74) *Attorney, Agent, or Firm* — Jefferson IP Law, LLP

(57) ABSTRACT

In various embodiments, an electronic device comprising a communication circuit, a processor, and a memory is disclosed. The memory may store instructions that, when executed, cause the processor to transmit, to a network, a first session initiation protocol (SIP) invite message including at least one dummy value by using the communication circuit, obtain channel state information by using the communication circuit, determine a codec for performing a packet based call on the basis of channel state information, and transmit, to the network, a second SIP invite message including information of the determined codec by using the communication circuit. Various other embodiments are also possible which are known from the specification.

13 Claims, 9 Drawing Sheets

(51) Int. Cl.
  *H04L 65/1069*  (2022.01)
  *H04L 65/80*  (2022.01)
  *H04N 21/2343*  (2011.01)
  *H04N 21/643*  (2011.01)

(58) Field of Classification Search
  USPC .................................................. 370/351, 352
  See application file for complete search history.

(56) References Cited

U.S. PATENT DOCUMENTS

| | | |
|---|---|---|
| 7,826,868 B2 | 11/2010 | Robbins et al. |
| 7,882,214 B2 | 2/2011 | Ozaki et al. |
| 8,416,690 B2 | 4/2013 | Zhao et al. |
| 8,422,373 B2 | 4/2013 | Alanara |
| 8,593,499 B2 | 11/2013 | Choi |
| 9,251,795 B2 | 2/2016 | Patel et al. |
| 9,253,238 B2 | 2/2016 | Khay-Ibbat et al. |
| 2003/0189900 A1 | 10/2003 | Barany et al. |
| 2004/0072593 A1 | 4/2004 | Robbins et al. |
| 2006/0205436 A1 | 9/2006 | Liu et al. |
| 2006/0294242 A1 | 12/2006 | Ozaki et al. |
| 2008/0320526 A1* | 12/2008 | Franceschini ......... H04W 76/15 725/62 |
| 2009/0064218 A1* | 3/2009 | Yamagishi ......... H04N 21/4882 725/25 |
| 2010/0150143 A1* | 6/2010 | Ku ....................... H04L 61/106 370/356 |
| 2010/0284278 A1 | 11/2010 | Alanara |
| 2011/0170410 A1* | 7/2011 | Zhao ....................... H04L 47/14 370/232 |
| 2014/0067405 A1 | 3/2014 | Patel et al. |
| 2016/0226785 A1 | 8/2016 | Khay-Ibbat et al. |
| 2016/0359942 A1* | 12/2016 | Li ....................... H04L 65/1069 |

\* cited by examiner

METHOD FOR CONTROLLING CODEC ON BASIS OF CHANNEL CONDITIONS AND ELECTRONIC DEVICE

TECHNICAL FIELD

Various embodiments of the disclosure relate to a method for controlling a codec based on channel situations and an electronic device therefor.

BACKGROUND ART

To improve sound quality and efficiency of a voice call over a circuit switched (CS) network, a voice call over a packet switched (PS) network has been used. For example, a voice over internet protocol (VoIP) technology based on an internet protocol (IP) may be used. In the VoIP technology, a voice and/or an image may be exchanged through a data packet. The VoIP technology is applicable to various network platforms based on a packet data network. For example, for a VoIP in long term evolution (LTE) wireless communication, voice over LTE (VoLTE) may be used.

An electronic device may be configured to encode a voice and/or an image of a user and transmit a packet including the generated voice and/or image data. For example, the electronic device may encode a voice and/or an image using its codec.

DISCLOSURE

Technical Problem

An electronic device may support various codecs. For example, codecs may differ from each other in coding method, codec standard, bandwidth, and/or bitrate. The electronic device may negotiate with a network for parameters (e.g., a coding method, resolution, a frame per second (FPS), a codec standard, a bandwidth, and/or a bitrate) of a codec (e.g., a voice code and/or a video codec) when an incoming call or an outgoing call is initiated. For example, the network may set parameters associated with the codec of the electronic device based on data traffic of the network.

The network may set the codec in the electronic device without regard to a channel situation of the electronic device, such as a weak electric field. Furthermore, the codec set once may fail to be changed according to a channel state. When a channel situation of the electronic device is poor, video stuttering due to the loss of packets, buffering, mute, and/or noise may occur.

According to various embodiments of the disclosure, the electronic device may adaptively control a codex based on a channel state to prevent call quality from being degraded due to loss of packets.

According to various embodiments of the disclosure, a method for adaptively controlling a codec based on a channel state and an electronic device therefor may be provided.

Technical Solution

In accordance with an aspect of the disclosure, an electronic device is provided. The electronic device may include a communication circuitry, a processor operatively connected to the communication circuitry, and a memory electrically connected to the processor. The memory may store instructions, when executed, causing the processor to transmit a first session initiation protocol (SIP) invite message including at least one dummy value to a network using the communication circuitry, obtain channel state information using the communication circuitry, determine a codec for performing a packet based call based on the channel state information, and transmit a second SIP invite message including the determined codec information to the network using the communication circuitry.

In accordance with another aspect of the disclosure, a method for adaptively controlling a codec rate in an electronic device is provided. The method may include transmitting a first session initiation protocol (SIP) invite message including at least one dummy value to a network using a communication circuitry of the electronic device, obtaining channel state information using the communication circuitry, determining a codec for performing a packet based call based on the channel state information, and transmitting a second SIP invite message including the determined codec information to the network using the communication circuitry.

In accordance with another aspect of the disclosure, a computer-readable storage medium is provided. The computer-readable storage medium may store instructions, when executed, causing a processor to transmit a first session initiation protocol (SIP) invite message including at least one dummy value to a network using a communication circuitry of the electronic device, obtain channel state information using the communication circuitry, determine a codec for performing a packet based call based on the channel state information, and transmit a second SIP invite message including the determined codec information to the network using the communication circuitry.

Advantageous Effects

According to various embodiments of the disclosure, the electronic device may adaptively control a codex based on a channel state to prevent communication quality from being degraded.

According to various embodiments of the disclosure, the electronic device may perform adaptive codec control using an existing wireless protocol by using a dummy message.

In addition, various effects ascertained directly or indirectly through the disclosure may be provided.

With regard to description of drawings, the same or similar denotations may be used for the same or similar components.

MODE FOR INVENTION

Hereinafter, various embodiments of the disclosure may be described with reference to accompanying drawings. Accordingly, those of ordinary skill in the art will recognize that modification, equivalent, and/or alternative on the various embodiments described herein can be variously made without departing from the scope and spirit of the disclosure.

Figure 1:
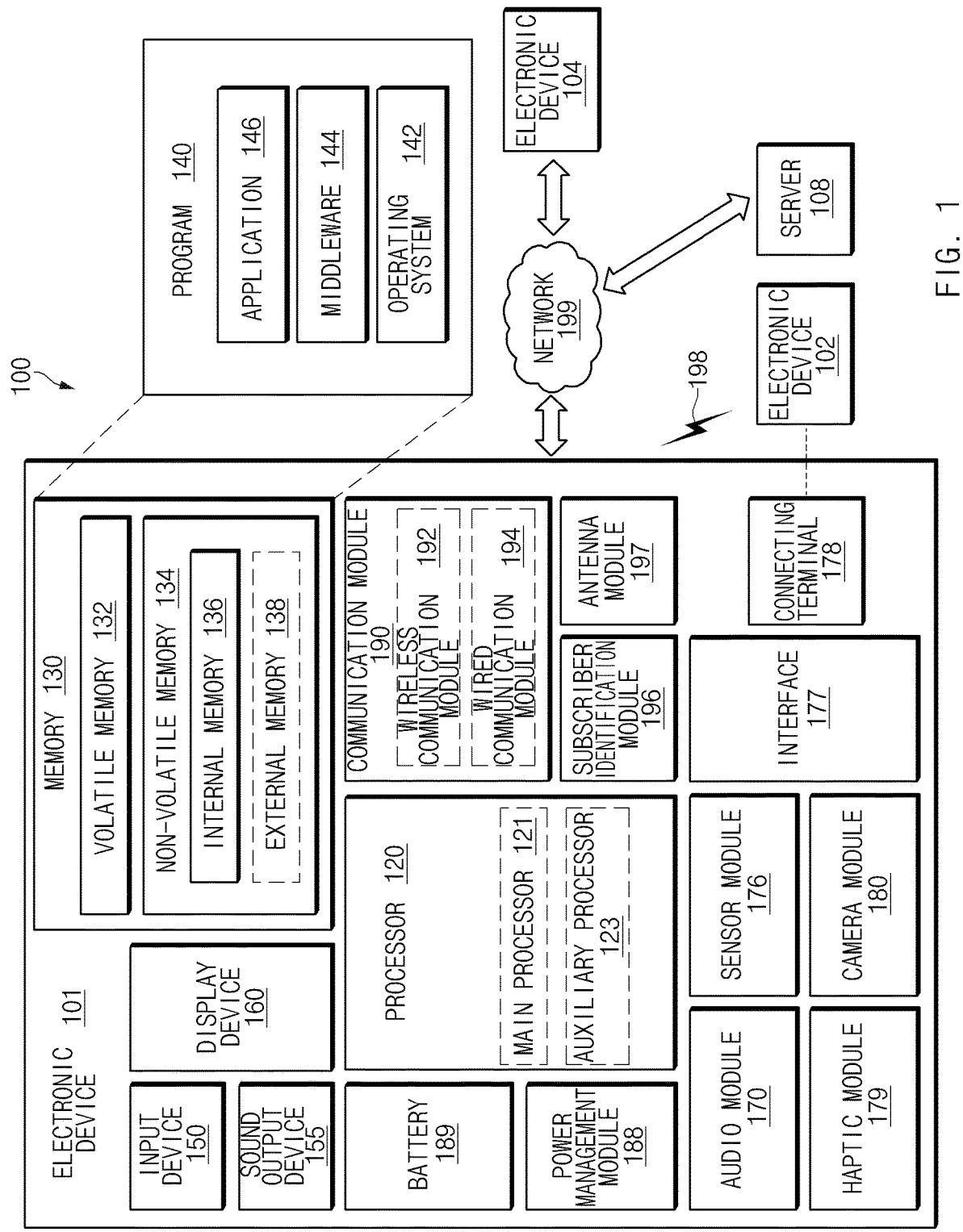
FIG. 1 illustrates a block diagram of an electronic device in a network environment according to various embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, or a keyboard.

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector), The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™ wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include one or more antennas, and, therefrom, at least one antenna appropriate for a communication scheme used in the communication network, such as the first network 198 or the second network 199, may be selected, for example, by the communication module 190 (e.g., the wireless communication module 192). The signal or the power may then be transmitted or received between the communication module 190 and the external electronic device via the selected at least one antenna.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
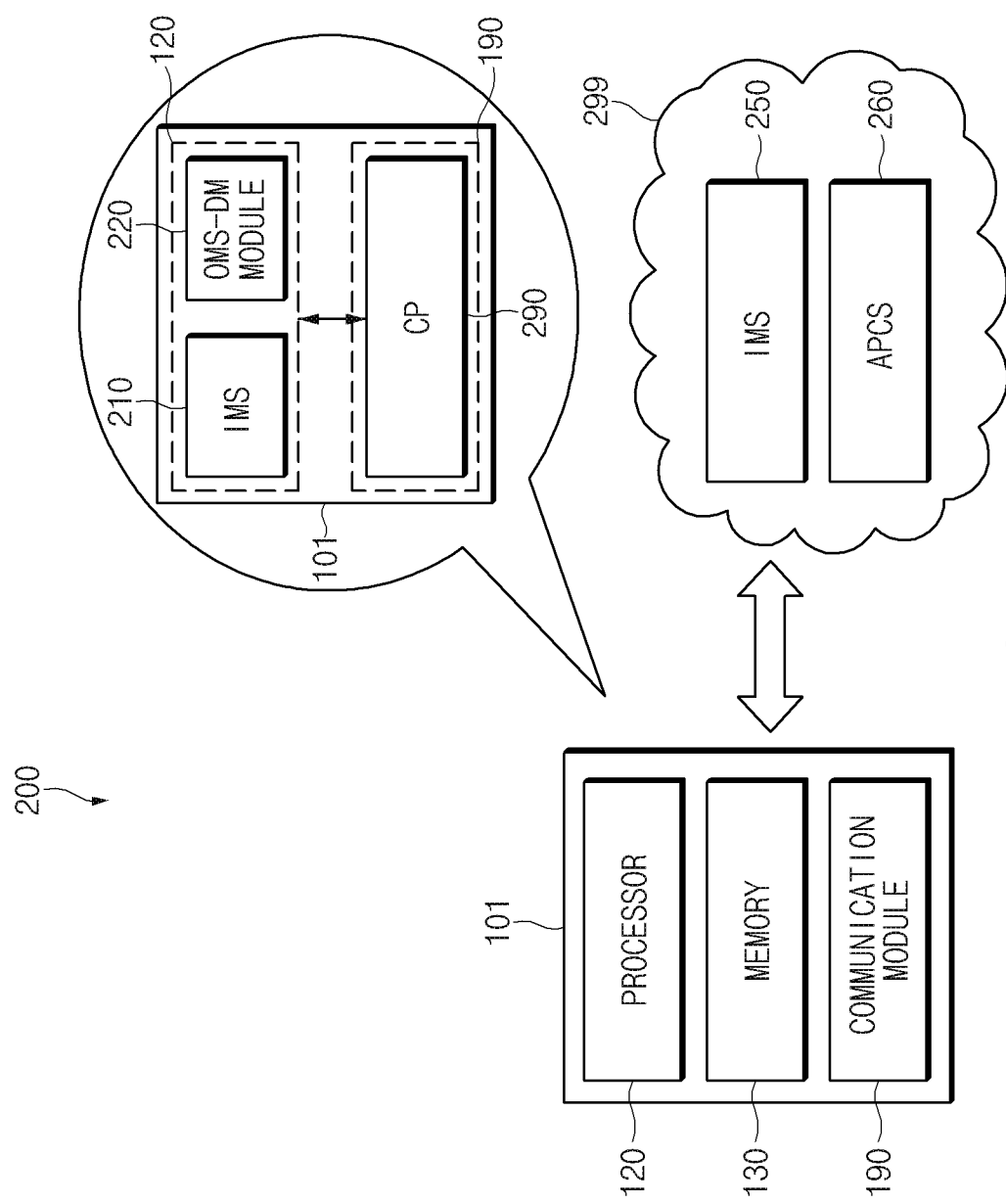
FIG. 2 illustrates a configuration of an electronic device and a network according to various embodiments.

FIG. 2 illustrates a configuration of an electronic device 101 and a network 299 according to various embodiments.

According to various embodiments, the electronic device 101 may be a device configured to perform a call. According to an embodiment, the electronic device 101 may be configured to perform a call based on packet data. For example, the electronic device 101 may be configured to perform a video call and/or a voice call based on packet data. According to an embodiment, the electronic device 101 may be configured to perform a packet based call over an LTE network. For example, the electronic device 101 may be configured to perform a voice call based on voice over long-term evolution (VoLTE). According to an embodiment, the electronic device 101 may include a processor 120, a memory 130, and a communication module 190. According to an embodiment, the electronic device 101 may further include other components which are not shown in FIG. 2. For example, the electronic device 101 may include a device (e.g., an audio module 170 of FIG. 1) for receiving and outputting a voice, a display (e.g., a display device 160 of FIG. 1), a device (e.g., a camera module 180 of FIG. 1) for receiving an image, and/or a proximity sensor (e.g., a sensor module 176).

According to various embodiments, the processor 120 may be operatively or electrically coupled with the memory 130 and the communication module 190 and may control operations of the memory 130, the communication module 190, and the electronic device 101. According to an embodiment, the processor 120 may include an application processor.

According to various embodiments, the memory 130 may store at least one instruction causing the processor 120 to perform various operations.

According to various embodiments, the communication module 190 may be configured to perform functions for communication with a network 299 (e.g., a second network 199 of FIG. 1). For example, the communication module 190 may be configured to transmit and receive a wireless signal. According to an embodiment, the communication module 190 may include at least one communication circuitry. For example, the communication module 190 may include a communication processor (CP) for communication with a cellular network. For example, the cellular processor may be referred to as a modem.

A block diagram 200 of FIG. 2 is a block diagram illustrating conceptual communication between the processor 120 and the communication module 190 of the electronic device 101. According to an embodiment the electronic device 101 may include an IMS 210 and an open mobile alliance-device management (OMA-DM) module 220. According to an embodiment the IMS 210 and the OMA-DM module 220 may be software modules implemented by the processor 120. For example, the IMS 210 and the OMA-DM module 220 may be software modules implemented in the memory 130 by the processor 120. According to an embodiment the IMS 210 and/or the OMA-DM module 220 may be hardware modules included in the processor 120. According to an embodiment, a CP 290 may be a software or hardware configuration included in the communication module 190.

According to various embodiments, the IMS 210 may refer to a layer for processing data associated with the IMS. According to an embodiment, the IMS 210 may perform communication with an IMS 250 of the network 299 based on an SIP. According to an embodiment, the IMS 210 may generate a message (e.g., an SIP invite message) requesting a call (e.g., a voice call or a video call). For example, when a user input requesting a call through a call application of the electronic device 101 is received, the IMS 210 may generate an SIP invite message. According to an embodiment, the SIP invite message may be transmitted to the network 299 via the CP 260.

According to various embodiments, the OMA-DM module 220 may be configured to process a message based on an OMA-DM protocol. According to an embodiment, the OMA-DM module 220 may be configured to process a message (e.g., a device management message) based on the OMA-DM protocol, which is received from the network 299. According to an embodiment, the OMA-DM module 220 may be configured to perform provisioning for setting the electronic device 101.

According to an embodiment, the CP 260 may process a message in a baseband. For example, the CP 260 may transmit data processed in the baseband to the network 299 via the communication module 190.

According to an embodiment, the IMS 210 may obtain setting information from the OMA-DM module 220. According to an embodiment, the IMS 210 and/or the OMA-DM module 220 may transmit and/or receive data, using the CP 290. For example, the processor 120 (e.g., the IMS 210 and/or the OMA-DM module 220) may transmit or receive data via the CP 290 or a radio interface layer (RIL).

In embodiments below, an operation of the IMS 210 and/or the OMA-DM module 220 may be referred to as an operation of the processor 120. In embodiments below, an operation of the CP 290 may be referred to as an operation of the communication module 190. In embodiments below, a codec may refer to a voice codec and/or a video codec.

Figure 3:
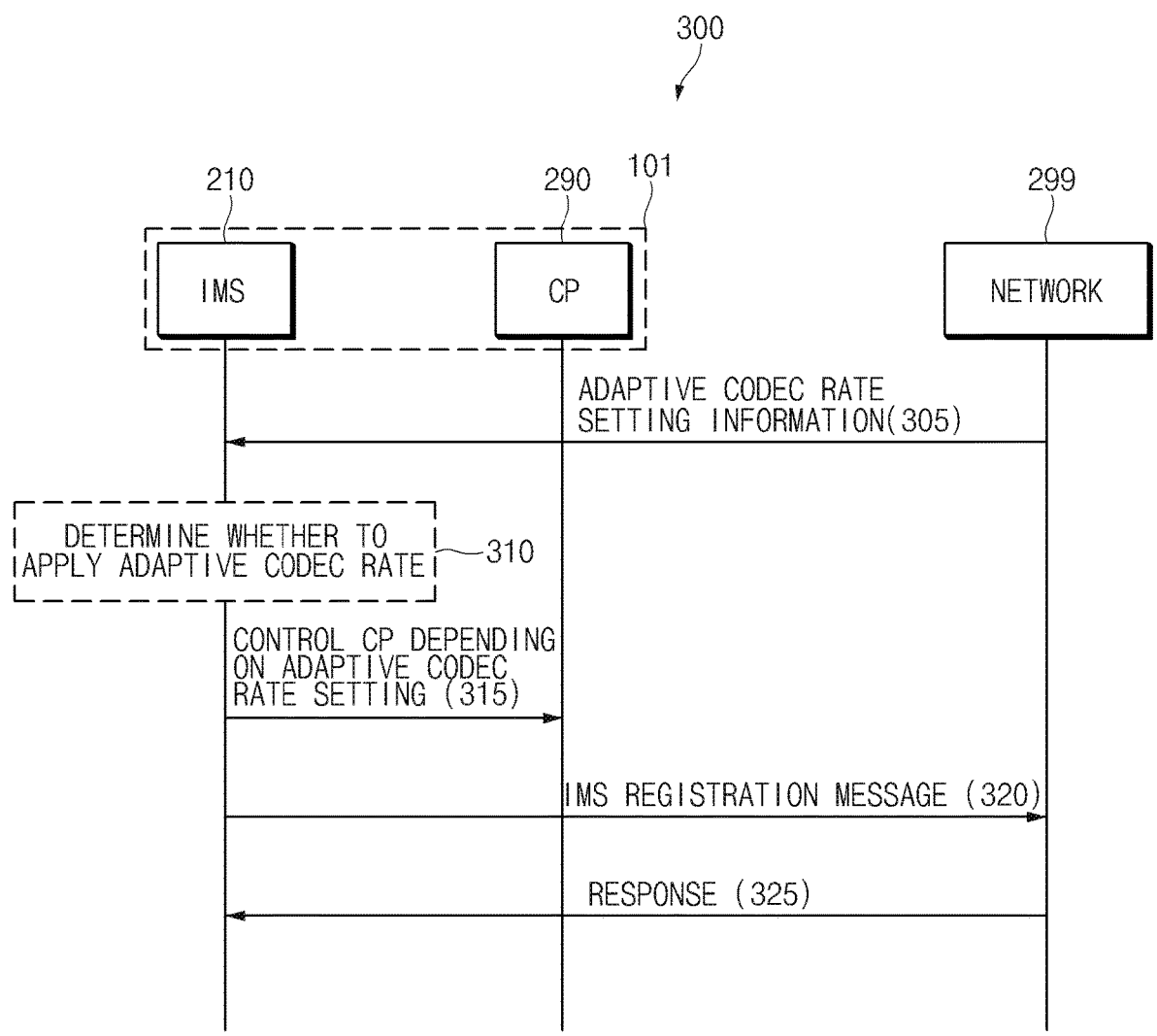
FIG. 3 is a signal sequence diagram of a method for setting an adaptive codec rate in an electronic device according to various embodiments.

FIG. 3 is a signal sequence diagram illustrating a method 300 for setting an adaptive codec rate in an electronic device according to various embodiments.

An electronic device 101 according to various embodiments may include a processor 120 and a communication module 190. The processor 210 of the electronic device 101 may include an IMS 210, and the communication module 190 may include a CP 290.

According to various embodiments, a network 299 may be configured to control communication of various devices including the electronic device 101. According to an embodiment the network 299 may be a cellular network. According to an embodiment, the network 299 may include at least one server for controlling wireless communication (e.g., cellular communication). For example, the at least one server included in the network 299 may configure at least one base station or a part of the base station.

According to various embodiments, the network 299 may include an IP multimedia subsystem (IMS) 250 and an auto provisioning and configuration server (APCS) 260. For example, the IMS 250 and the APCS 260 may be implemented as one server or a plurality of servers.

According to various embodiments, the IMS 250 may process a message associated with the IMS. According to an embodiment, the IMS 250 may refer to a structural framework for providing a packet based call (e.g., a video call and/or a voice call). According to an embodiment, the IMS 250 may be configured to perform message transmission and reception using an internet engineering task force (IETF) based protocol (e.g., a session initiation protocol (SIP)).

According to various embodiments, the APCS 260 may be configured to manage data traffic communication parameters of a client (e.g., the electronic device 101) and/or the network 299. According to an embodiment, the APCS 260 may be configured to provision settings associated with a service. According to an embodiment, the APCS 260 may be located on a rich communication services (RCS) network of a mobile network operator. According to an embodiment, the APCS 260 may be configured to manage and store setting information about an adaptive codec rate function of the client (e.g., the electronic device 101). For example, the network 299 may transmit information associated with a codec (e.g., a type, resolution, an FPS, a bandwidth, and/or a bitrate of the codec), which is obtained from the APCS 260, to the electronic device 101. For example, the APCS 260 may manage and store setting information about the adaptive codec rate function for each client group (granularity).

According to various embodiments, the network 299 may control an adaptive codec rate setting for the electronic device 101 using an APCS (e.g., the APCS 260 of FIG. 2). For example, the network 299 may enable or disable (e.g., turn on or turn off) an adaptive codec rate setting of the electronic device 101. In embodiments described below, the adaptive codec rate may refer to an adaptive code rate for a voice codec and/or a video codec. According to an embodiment, the electronic device 101, the adaptive codec rate setting of which is enabled, may control a parameter adaptively associated with the codec (e.g., a type, resolution, an FPS, and/or a bitrate of the codec), depending on embodiments described below. According to an embodiment, operation 305 described below may be performed after a procedure where the electronic device 101 is registered with the network 299.

According to various embodiments, referring to operation 305, the network 299 may transmit adaptive codec rate setting information (e.g., default adaptive multi rate (AMR) information) to the electronic device 101. According to an embodiment, the network 299 may transmit the adaptive codec rate setting information set by the APCS 260 to the electronic device 101. According to an embodiment, the network 299 may transmit the adaptive codec rate setting information (e.g., the default AMR bitrate information) using the OMA-DM message. For example, a device management (DM) server (not shown) of the network 299 may transmit the adaptive codec rate setting information to the electronic device 101 using the OMR-DM message.

According to various embodiments, the adaptive codec rate setting information may be set to indicate one of at least a first value and a second value. According to an embodiment, the adaptive codec rate setting information may be set to indicate at least four values. For example, the adaptive codec rate setting information may include a 1-, 2-, or 4-bit indicator.

According to various embodiments, the electronic device 101 may be instructed to set an adaptive codec rate based on a value of the adaptive codec rate setting information. For example, a first value of the adaptive codec rate setting information may indicate to enable adaptive codec rate settings for the voice and video codecs. For example, a second value of the adaptive codec rate setting information may indicate to disable adaptive codec rate settings for the voice and video codecs and may indicate that there is no change in adaptive rate setting. For another example, the first value of the adaptive codec rate setting information may indicate to enable the adaptive codec rate setting of the voice codec, the second value of the adaptive codec rate setting information may indicate to enable the adaptive codec rate setting of the video codec, a third value of the adaptive codec rate setting information may indicate to enable the adaptive codec rate settings of the voice and video codecs, and a fourth value of the adaptive codec rate setting information may indicate to disable the adaptive codec rate settings of the voice and video codecs. For another example, the first value of the adaptive codec rate setting information may indicate to enable the adaptive codec rate settings of the voice codec and the video codec, the second value of the adaptive codec rate setting information may indicate to disable the adaptive codec rate settings of the voice codec and the video codec, the third value of the adaptive codec rate setting information may indicate to enable the adaptive codec rate setting of the voice codec, and the fourth value of the adaptive codec rate setting information may indicate to enable the adaptive codec rate setting of the video codec.

According to various embodiments, the network 299 (e.g., the APCS 260) may set the adaptive codec rate setting information based on at least one of network traffic, call quality, and/or a subscriber request. According to an embodiment, the APCS 260 may manage and store the adaptive codec rate setting information based on congestion of network traffic. For example, when the network traffic is greater than or equal to a specified amount or when the network traffic is greater than or equal to a specified rate of an available throughput of a corresponding network, the APCS 260 may set the adaptive code rate setting information to enable an adaptive codec rate setting of the video codec and/or the voice codec. According to an embodiment, the APCS 260 may manage and store the adaptive codec rate setting information to enable an adaptive codec rate setting with respect to a subscriber who has statistically low network quality. For example, the APCS 260 may set default AMR bitrate information about the subscriber who has the statistically low network quality as a value corresponding to enabling the adaptive codec rate setting of the voice codec and/or the video codec. For example, the subscriber who has the low network quality may include a subscriber indicating a block error rate (BLER) of a specified range or more. According to an embodiment, the APCS 260 may manage and store the default AMR bitrate information to enable an adaptive codec rate setting with respect to a subscriber located in an area where network quality is statistically low. For example, the APCS 260 may set default AMR bitrate information about the subscriber located in the area where the network quality is statistically low as a value corresponding to enabling the adaptive codec rate setting of the voice codec and/or the video codec. According to an embodiment, the APCS 260 may manage and store the default AMR bitrate information to enable an adaptive codec rate setting based on a subscriber request. For example, the APCS 260 may set a value of the default AMR bitrate information as a value corresponding to enabling the adaptive codec rate setting of the voice codec and/or the video codec to indicate to enable an adaptive codec rate setting with respect to a subscriber whose voice of customer (e.g., complaint about call quality) is received. According to an embodiment, the APCS 260 may manage and store the default AMR bitrate information to enable or disable an adaptive codec rate setting of a subscriber based on billing information of the subscriber.

In the embodiment of FIG. 3, the adaptive codec rate setting may be transmitted to the electronic device 101 using the adaptive codec rate setting information. The default AMR bitrate information may be an example of the adaptive codec rate setting information, and embodiments of the disclosure are not limited thereto. For example, the network 299 may transmit the adaptive codec rate setting information to the electronic device 101 using another information of the OMA-DM message. For example, the network 299 may transmit the adaptive codec rate setting information to the electronic device 101 using another message except for the OMA-DM message.

According to various embodiments, in operation 310, the IMS 210 of the electronic device 101 may determine whether to apply an adaptive codec rate. The IMS 210 may determine whether to apply the adaptive codec rate based on the adaptive codec rate setting information (e.g., the default AMR bitrate information) received from the network 299. According to an embodiment, when the default AMR bitrate information indicates the first value, the IMS 210 may determine that an adaptive codec rate for the voice codec is applied (e.g., that an adaptive codec rate setting is enabled). For example, when the default AMR bitrate information indicates another value (e.g., the second value) except for the first value, the IMS 210 may determine that the adaptive codec rate for the voice codec is not applied. For example, when the default AMR bitrate information indicates another value except for the first value, the IMS 210 may fail to change an adaptive codec rate setting. According to another embodiment, when the adaptive codec rate setting information indicates the first value, the IMS 210 may determine that the adaptive codec rate setting for the voice codec is enabled. When the adaptive codec rate setting information indicates the second value, the IMS 210 may determine that an adaptive codec rate setting for the video codec is enabled. When the adaptive codec rate setting information indicates the third value, the IMS 210 may determine that the adaptive codec rate settings for the video codec and the voice codec are enabled. When the adaptive codec rate setting information indicates the fourth value, the IMS 210 may determine that the adaptive codec rate settings for the video codec and the voice codec are disabled. According to another embodiment, when the adaptive codec rate setting information indicates the first value, the IMS 210 may determine that the adaptive codec rate settings for the voice codec and the video codec are enabled. When the adaptive codec rate setting information indicates the second value, the IMS 210 may determine that the adaptive codec rate settings for the video codec and the voice codec are disabled. When the adaptive codec rate setting information indicates the third value, the IMS 210 may determine that the adaptive codec rate setting for the voice codec is enabled. When the adaptive codec rate setting information indicates the fourth value, the IMS 210 may determine that the adaptive codec rate setting for the video codec is enabled.

According to an embodiment, operation 310 may be omitted. For example, it may be described that the IMS 210 performs operation 315 based on a value received from the network 299 (e.g., a value of adaptive codec rate setting information).

According to various embodiments, in operation 315, the IMS 210 may control the CP 290 depending on the adaptive codec rate setting of the CP 290. According to an embodiment, when the adaptive codec rate setting information indicates to enable an adaptive codec rate setting, the IMS 210 may allow the CP 290 to deliver a channel state (e.g., a block error rate (BLER)) and/or a reference signal received signal (RSRP)) or information based on the channel state to the IMS 210. For example, when the adaptive codec rate setting is enabled, the IMS 210 may allow the CP 290 to deliver communication quality on a periodic basis. For example, when the adaptive codec rate setting is enabled, the IMS 210 may allow the CP 290 to deliver information about a channel state to the IMS 210 when communication quality is less than or equal to a specified range (e.g., an RSRP of a specified first range or less and/or a BLER of a specified second range or more). For example, when the adaptive codec rate setting is enabled, the IMS 210 may allow the CP 290 to deliver information indicating that communication quality is less than or equal to the specified range to the IMS 210. According to an embodiment, the IMS 210 may deliver a message for control of an adaptive codec rate setting to the CP 290 via an RIL.

According to various embodiments, in operation 320, the IMS 210 may transmit an IMS registration message to the network 299 (e.g., an IMS 250 of FIG. 2). For example, the IMS 210 may transmit an IMS registration message (e.g., an SIP register message) via the CP 290.

According to various embodiments, in operation 325, the IMS 210 may receive a response from the network 299 via the CP 290. For example, the response may indicate "unauthorized". For example, the response may indicate an acknowledgement (e.g., an SIP 200 OK message). According to an embodiment, when IMS registration of the electronic device 101 is completed, the network 299 may transmit the 200 OK message based on the SIP to the electronic device 101 in response.

In the embodiment of FIG. 3, the network 299 may control an adaptive codec rate setting of the electronic device 101 through operations 305, 310, and 320. According to various embodiments, the adaptive codec rate setting may be controlled by the electronic device 101. According to an embodiment, the electronic device 101 may control an adaptive codec rate setting based on a user input. For example, the electronic device 101 may provide a user interface for controlling the adaptive codec rate setting. For example, the electronic device 101 may be configured to provide a user with a message (e.g., a pop-up message) for quickening control of the adaptive codec rate setting when call quality is less than a specified range.

Figure 4:
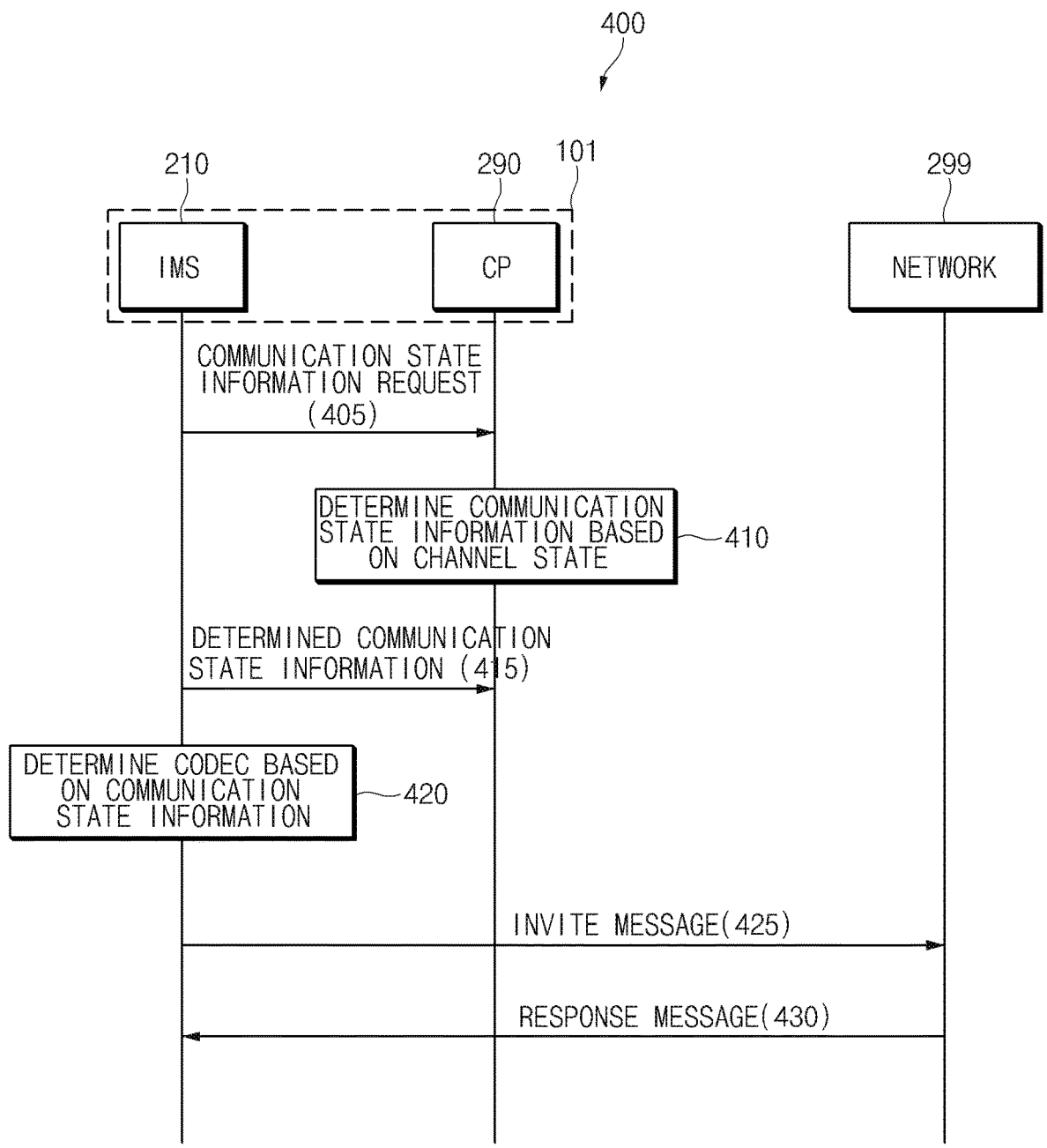
FIG. 4 is a signal sequence diagram of a method for controlling an adaptive codec rate based on determination of a CP according to various embodiments.

FIG. 4 is a signal sequence diagram 400 of a method for controlling an adaptive codec rate based on determination of a CP 290 according to various embodiments.

According to various embodiments, an electronic device 101 may perform the method for controlling the adaptive codec rate, when a packet based call (e.g., a voice call and/or a video call) is initiated or while the packet based call is performed. For example, when an adaptive codec rate setting is enabled for the electronic device 101, the electronic device 101 may perform the method for controlling the adaptive codec rate.

According to various embodiments, in operation 405, the IMS 210 may request communication state information from a CP 290. According to an embodiment, the IMS 210 may perform operation 405 when a packet based call is initiated. According to an embodiment, the IMS 210 may perform operation 405 at a specified period while the packet based call is performed.

According to various embodiments, the communication state information may indicate a plurality of states. According to an embodiment, the communication state information may be information indicating whether there is a weak electronic field. For example, a first state of the communication state may indicate a weak electric field, and a second state of the communication state may indicate a non-weak electric field. For example, the communication state information may be 1-bit information indicating whether there is a weak electric field. According to an embodiment, the communication state information may indicate one of a plurality of values respectively corresponding to a plurality of communication states. For example, the communication state information may be one of a weak electric field, a middle electric field, or a strong electric field.

According to various embodiments, in operation 410, the CP 290 may determine communication state information based on a channel state. According to an embodiment, the channel state may include at least one of a reference signal received power (RSRP) and a BLER. For example, when the RSRP is less than a specified first range, the CP 290 may determine the communication state as a first state (e.g., a weak electric field). The CP 290 may measure an RSRP using a cell-specific reference signal (CRS). For example, when the BLER is greater than a specified second range, the CP 290 may determine the communication state as the first state. For example, when the RSRP is less than the specified first range and when the BLER is greater than the specified second range, the CP 290 may determine the communication state as the first state. For example, the CP 290 may determine a BLER based on a response (e.g., acknowledgement (ACK), negative-ACK (NACK), and/or discontinuous transmission (DTX)) from the network 299 for uplink transmission. According to an embodiment, the CP 290 may determine a communication state based on a plurality of threshold values and a channel state (e.g., an RSRP and/or a BLER).

According to various embodiments, in operation 415, the CP 290 may deliver the determined communication state information to the IMS 210. For example, the communication state information may indicate the first state (e.g., the weak electric field) or a second state (e.g., a non-electric field). For example, the communication state information may indicate one of a plurality of states.

According to various embodiments, in operation 420, the IMS 210 may determine a codec (e.g., a voice codec and/or a video codec) to be used for a packet based call based on the communication state information. According to an embodiment, the IMS 210 may determine a type, a bandwidth, resolution, an FPS, and/or a bitrate of the codec based on the communication state information. For example, when the communication state information indicates the first state (e.g., the weak electric field), the IMS 210 may use a codec having a relatively low bitrate for a packet based call.

According to various embodiments, in operation 420, the IMS 210 may determine priorities of a plurality of codecs based on the communication state information. According to an embodiment, when the communication state indicates the first state (e.g., the weak electric field), the IMS 210 may set a high priority for a codec having a low bitrate, bandwidth, FPS, and/or resolution. For example, the IMS 210 may select at least one codec suitable for a current communication state and may set a codex having the highest bitrate, bandwidth, FPS, and/or resolution among the at least one selected codec to the highest priority. According to an embodiment, the IMS 210 may include at least one codec specified according to the communication state information and/or a priority for the at least one codec in an invite message. For example, the IMS 210 may include a codec corresponding to the communication state information and/or priority information of the codec in an invite message using a lookup table including the codec for the communication state information and/or the priority information of the codec.

According to various embodiments, in operation 425, the IMS 210 may transmit an invite message (e.g., an SIP invite message) including type, bandwidth, FPS, resolution, and/or bitrate information of the at least one determined codec to the network 299. For example, the IMS 210 may transmit the invite message to the network 299 via the CP 290.

According to various embodiments, the invite message may include information about a capability of a user device (e.g., the electronic device 101). According to an embodiment, the information about the capability of the user device may include information about at least one codec supportable by the user device. For example, the information about the codec may include at least one of a type, a bitrate range (e.g., an upper limit and a lower limit), a bandwidth, an FPS, resolution, or adaptive multi-rate (AMR) setting information of the codec. According to an embodiment, the information about the capability of the user device may include information about a plurality of codecs and priority information about the plurality of codecs. For example, the information about the plurality of codecs may be arranged in a descending order of priorities.

According to various embodiments, the IMS 210 may include the information of the codec, which is determined based on the communication state information in operation 420, in the invite message. According to an embodiment, the IMS 210 may include the information of the codec, which is determined based on the communication state information, in the invite message in a high priority. For example, the IMS 210 may transmit the information about the plurality of codecs including priorities to the network 299 via the CP 290 to negotiate with the network 299 for the codec.

According to various embodiments, in operation 430, the network 299 may transmit a response message to the IMS 210. For example, the response message may be an SIP 200 OK message.

In the embodiment of FIG. 4, the IMS 210 determines the codec based on the communication state information determined by the CP 290, but the method for controlling the adaptive codec rate in the disclosure is not limited thereto.

Figure 5:
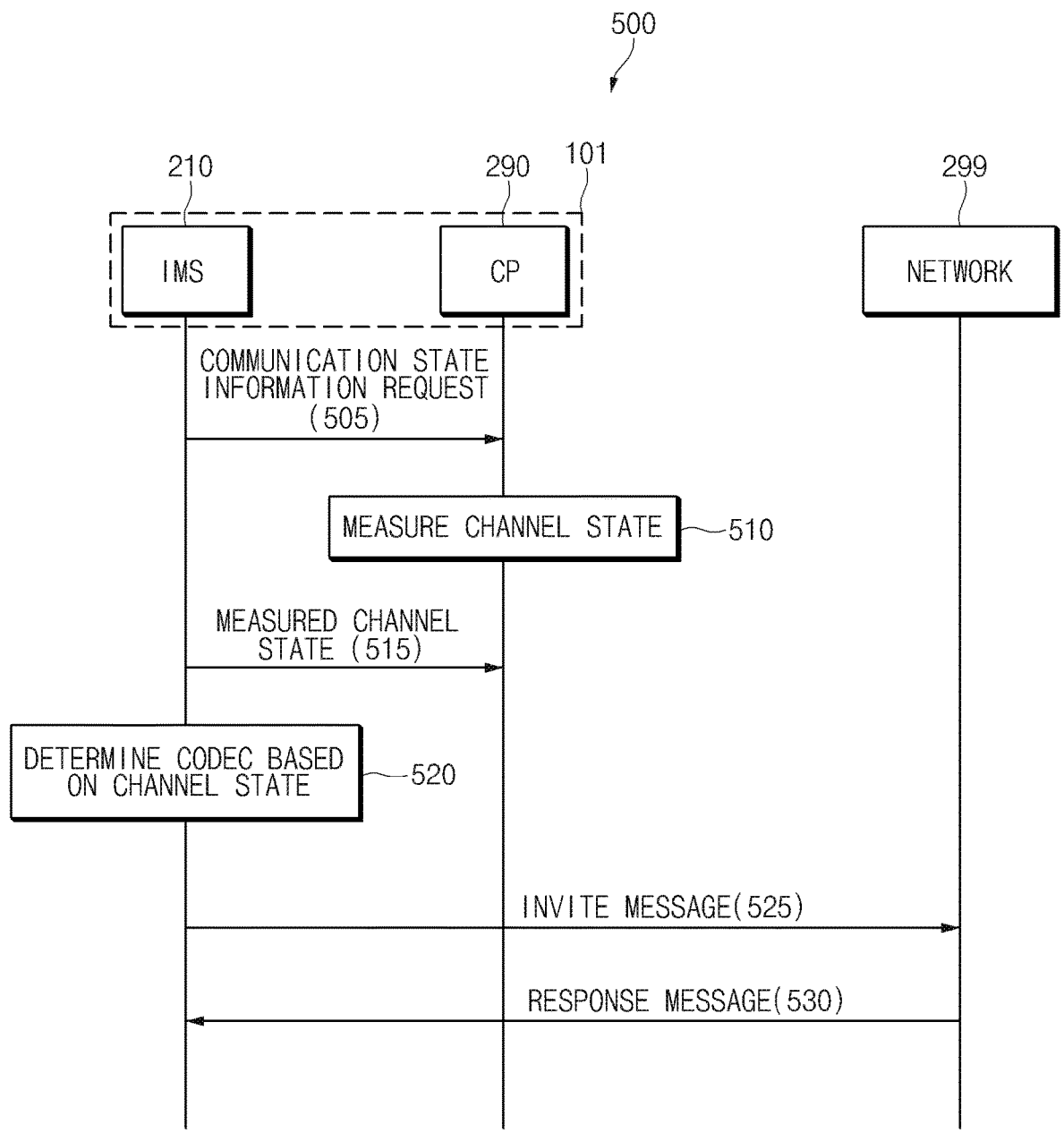
FIG. 5 is a signal sequence diagram of a method for controlling an adaptive codec rate based on determination of an IMS according to various embodiments.

FIG. 5 is a signal sequence diagram 500 of a method for controlling an adaptive codec rate based on determination of an IMS 210 according to various embodiments.

In the embodiment of FIG. 5, a description of operation 505 may refer to the description of operation 405 of FIG. 4. A description of operation 525 may refer to the description of operation 425 of FIG. 4. A description of operation 530 may refer to the description of operation 430 of FIG. 4. For example, operations 505, 525, and 530 may be the same as operations 405, 425, and 430 of FIG. 4. For convenience of description, descriptions duplicated by FIG. 4 may be omitted. Unless described differently below, descriptions described above in conjunction with FIG. 4 are applicable to FIG. 5.

According to various embodiments, in operation 510, a CP 290 may measure a channel state. According to an embodiment, the CP 290 may measure a channel state based on an RSRP and/or a BLER. For example, the CP 290 may measure an RSRP based on a cell-reference signal (CRS).

According to various embodiments, in operation 515, the CP 290 may deliver the measured channel state to the IMS 210. According to an embodiment, when a communication state information request is received, the CP 290 may measure a channel state and may deliver the measured channel state to the IMS 210. According to an embodiment, when a communication state information request is received from the IMS 210, the CP 290 may deliver a previously obtained channel state to the IMS 210. According to an embodiment, operation 510 may be omitted. According to an embodiment, the CP 290 may measure a channel state at a specified period and may deliver a most recent measured channel state to the IMS 210. According to an embodiment, the CP 290 may deliver channel state information based on a plurality of measurement values to the IMS 210.

According to various embodiments, in operation 520, the IMS 210 may determine a codec based on the channel state. According to an embodiment, the IMS 210 may determine a type (e.g., the specification of a codec), a bandwidth, an FPS, resolution, and/or a bitrate of the codec (e.g., a video and/or voice codec) capable of performing reliable communication in a current channel state. As described above in conjunction with FIG. 4, the IMS 210 may select at least one codec (e.g., a codec capable of performing reliable communication) based on the channel state and may determine a priority for the at least one codec. For example, the IMS 210 may set the highest priority for a codec having the highest bitrate, bandwidth, FPS, and/or resolution among the at least one selected codec. According to an embodiment, the IMS 210 may include a specified codec (e.g., a type, a bandwidth, resolution, an FPS, and/or a bitrate of the codec) corresponding to the measured channel state in an invite message. For example the IMS 210 may include a codec corresponding to the communication state information and/or priority information of the codec in an invite message using a lookup table including the codec for the communication state information and/or the priority information of the codec.

Figure 6:
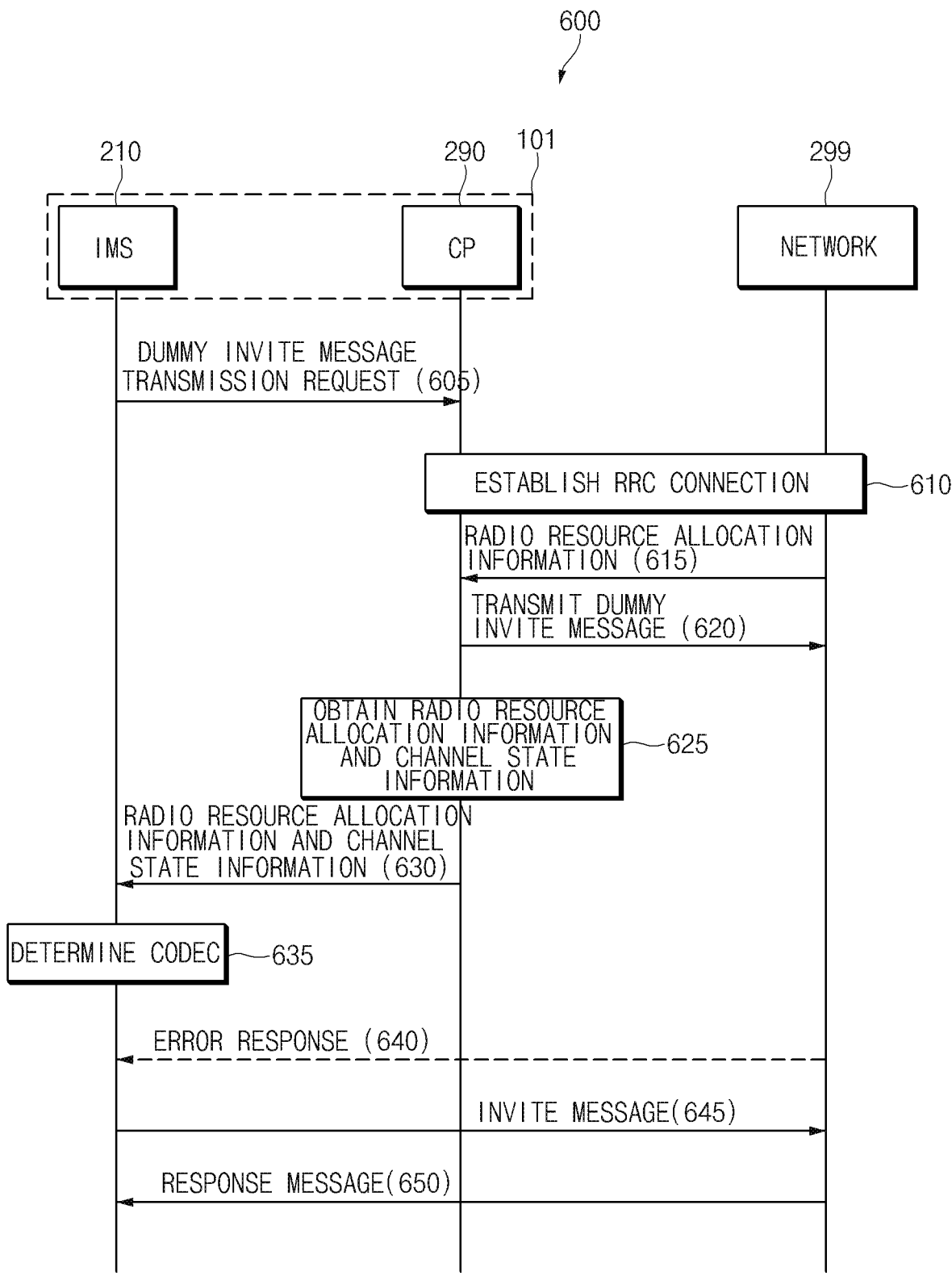
FIG. 6 is a signal sequence diagram of a method for controlling an adaptive codec rate in an RRC idle state according to various embodiments.

FIG. 6 is a signal sequence diagram 600 of a method for controlling an adaptive codec rate in an RRC idle state according to various embodiments.

In the embodiment of FIG. 6, a description of operation 645 may refer to the description of operation 425 of FIG. 4. A description of operation 650 may refer to the description of operation 430 of FIG. 4. For example, operations 645 and operation 650 may be the same as the operations 425 and 430 of FIG. 4. For convenience of description, descriptions duplicated by FIGS. 4 and 5 may be omitted. Unless particularly noted otherwise, descriptions described above in conjunction with FIGS. 4 and 5 are applicable to FIG. 6.

In the embodiment of FIG. 6, it may be assumed that an initial CP 290 is in a radio resource control (RRC) idle state. In the RRC idle state, because a radio resource is not allocated to an electronic device 101, the electronic device 101 may not measure a channel state. For example, the electronic device 101 may use a dummy invite message to measure a channel state.

According to various embodiments, referring to operation 605, the IMS 210 may deliver a dummy invite transmission request to the CP 290. According to an embodiment, the IMS 210 may deliver a dummy invite transmission request to the CP 290 when a packet based call (e.g., a voice call or a video call) based on packet data is initiated. For example, when a user input for initiating a packet based call is received, the IMS 210 may perform operation 605.

According to various embodiments, the dummy invite message may include at least one dummy value. According to an embodiment, the dummy invite message may fail to include a value of one of mandatory fields of a header of the SIP invite message. For example, the dummy invite message may refer to a message where at least one of the mandatory fields of the header of the SIP invite message is omitted. For another example, the dummy invite message may refer to an SIP message where at least one of the mandatory fields of the header is replaced with a dummy value. For another example, the dummy invite message may fail to include at least one of the To field, the From field, the CSeq field, the Call-ID field, the Max forwards field, and the Via field which are mandatory fields of the header. According to an embodiment, the dummy invite message may refer to a message where a value of at least one of fields of a header of the SIP invite message is set to an invalid value (e.g., a dummy value).

According to an embodiment, the dummy invite transmission request may be delivered to the CP 290 in the same manner as a normal invite transmission request.

According to various embodiments, in operation 610, the CP 290 may perform RRC connection establishment with the network 299. For example, the CP 290 may perform RRC connection establishment for the requested dummy invite transmission.

Figure 7:
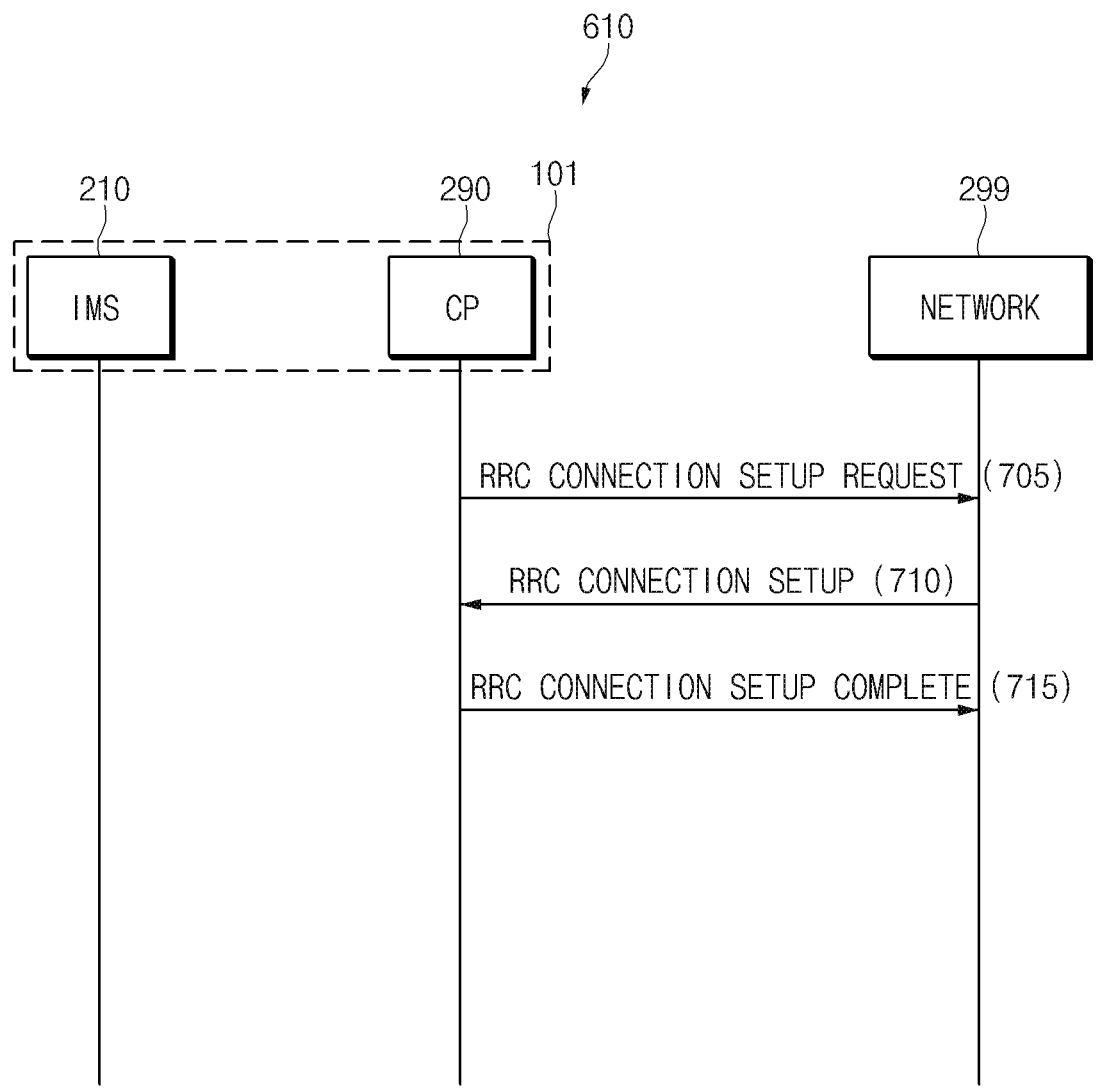
FIG. 7 is a signal sequence diagram of an RRC connection setup method according to various embodiments.

Referring to FIG. 7, operation 610 will be described. According to various embodiments, in operation 705, the CP 290 may transmit an RRC connection setup request to the network 299. For example, the RRC connection setup request may include an identifier (e.g., a temporary mobile subscriber identifier (TMSI) or a random value) of the electronic device 101. According to various embodiments, in operation 710, the CP 290 may receive the RRC connection setup from the network 299. For example, the RRC connection setup may include an identifier (e.g., a cell-radio network temporary identifier (C-RNTI)) of the network 299.

According to various embodiments, in operation 715, the CP 290 may transmit RRC connection setup complete to the network 299.

Referring again to FIG. 6, according to various embodiments, in operation 615, the electronic device 101 may receive radio resource allocation information from the network 299. According to an embodiment, the electronic device 101 may receive radio resource allocation information from the network 299 through downlink control information (DCI) included in a physical downlink control channel (PDCCH). For example, the radio resource allocation information may refer to uplink resource allocation (e.g., the allocated amount of uplink data) allocated to the electronic device 101. According to an embodiment, the radio resource allocation information may include at least one of number of resource block (NRB), a modulation and coding scheme (MCS), or the number of uplink (UL) grants. For example, the NRB may refer to the number of physical resource blocks allocated to the electronic device 101 and may have a value of 0 to 100. For example, the MCS may include information (e.g., an index) indicating a combination of a modulation method and a coding rate, which is allocated to the electronic device 101 by the network 299. For example, the MCS index may indicate random integer value of 0 or more to 28 or less. For example, the UL grant may include MCS and NRB information. For example, the number of UL grants may refer to the number of UL grants received by the electronic device 101. For example, the number of UL grants may refer to the number of resource blocks permitted for uplink transmission among resource blocks of the NRB. For example, the number of UL grants may refer to the number of UL subframes granted to the electronic device 101.

According to an embodiment, operation 615 may be performed during operation 610. For example, operation 615 may be performed after operation 710 of FIG. 7.

According to various embodiments, in operation 620, the CP 290 may transmit a dummy invite message to the network 299 using the allocated radio resource information.

According to various embodiments, in operation 625, the CP 290 may obtain radio resource allocation information and channel state information. According to an embodiment the CP 290 may obtain the radio resource allocation information through operation 615. According to an embodiment, the CP 290 may obtain the channel state information through operation 610, operation 615, and operation 620. For example, the channel state information may include at least one of an RSRP, a BLER, and a transmit power. According to an embodiment, the CP 290 may obtain an RSRP based on a reference signal (e.g., a CRS) received from the network 299 during operations 610 and 615. According to an embodiment, the CP 290 may obtain a BLER based on ACK/NACK information received from the network 299 during operations 610 and 615. According to an embodiment, the CP 290 may obtain a transmit power from a signal transmit power (e.g., a physical uplink shared channel (PUSCH) transmit power) used to transmit the dummy invite message in operation 620. For example, the transmit power may be indicated as a value (e.g., a dB value) indicating a difference between a maximum transmit power and a real transmit power of the electronic device 101.

According to various embodiments, in operation 630, the IMS 210 may obtain radio resource allocation information and channel state information from the CP 290.

According to various embodiments, in operation 635, the IMS 210 may determine a codec (e.g., a voice codec and/or a video codec) based on the radio resource allocation information and/or the channel state information. According to an embodiment, the IMS 210 may determine a type (e.g., the specification of a codec), a bandwidth, an FPS, resolution, and/or a bitrate of the codec based on the radio resource allocation information and/or the channel state information. According to an embodiment, the IMS 210 may determine a type of the codec and/or a bitrate of the codec based on at least one of an RSRP, a BLER, a transmit power, an NRB, an MCS, or the number of UL grants.

According to various embodiments, the IMS 210 may change a type, a bandwidth, resolution, an FPS, and/or a bitrate of the codec when the RSRP is less than a specified first value and may use a default codec when the RSRP is greater than or equal to the specified first value. According to an embodiment, when the RSRP is less than the specified first value, the IMS 210 may change a type, a bandwidth, resolution, an FPS, and/or a bitrate of the codec based on at least one of radio resource allocation information (e.g., the amount of allocated uplink resources), a BLER, and a transmit power.

According to various embodiments, the IMS 210 may determine a type of a codec to be changed and/or a bitrate of the codec to be changed, based on a main condition and a sub condition. For example, the main condition may refer to radio resource allocation information (e.g., an NRB, an MCS, and/or the number of UL grants). For example, the sub condition may include channel state information such as a BLER and/or a transmit power.

According to an embodiment, the IMS 210 may use a default codec (e.g., a specified codec or a codec received from a network) when the main condition meets a specified first condition and may determine a type, a bandwidth, resolution, an FPS, and/or a bitrate of the codec based on the sub condition and/or the main condition when the main condition meets a specified second condition. For example, the specified first condition may include a case where the amount of permitted uplink transmission data obtained from radio resource allocation information is greater than or equal to a specified second value, and the specified second condition may include a case where the permitted amount of uplink transmission data is less than the specified second value.

According to an embodiment, the IMS 210 may select one codec group from a plurality of codec groups based on the main condition and may select one codec from the selected codec group based on the sub condition.

According to an embodiment, the IMS 210 may determine the amount of granted uplink data based on the main condition and may determine a type and a bitrate of the codec based on the sub condition. For example, when the NRB is 7 and when the MCS is 5, the UL grant may be 60%, the BLER may be 30%, and the transmit power may be −23 dBm. In this case, the amount of granted uplink data indicated by the main condition is an amount sufficient for a voice call, but the sub condition (e.g., the BLER and the transmit power) may indicate a relatively poor channel state. For example, as the transmit power is higher and as the BLER is higher, the supplemental information may refer to a poorer channel state. When the supplemental information is greater than or equal to a specified range (e.g., when the BLER is greater than or equal to a specified third value and/or when the transmit power is greater than or equal to a specified fourth value), the IMS 210 may select a codec having a relatively small amount of data transfer and/or a low bitrate for reliable communication.

According to an embodiment, the IMS 210 may estimate the amount of successful uplink data based on the main condition and the BLER and may determine a type and a bitrate of the codec based on the main condition and the sub condition. For example, the IMS 210 may estimate the amount of granted uplink data indicated by the main condition and the amount of uplink data capable of being successfully transmitted to the network 299 using the BLER. According to an embodiment, the IMS 210 may determine a type and a bitrate of the codec using the estimated amount of successful UL data. For example, the IMS 210 may determine one of a plurality of codecs capable of satisfying the estimated amount of successful UL data. For example, the IMS 210 may select one of the plurality of codecs based on the supplemental information. For example, when the supplemental information indicates a poor channel state, the IMS 210 may select a codec having a low bitrate among the plurality of codecs. For example, when the supplemental information indicates a good channel state, the IMS 210 may select a codec having a high bitrate among the plurality of codecs.

According to various embodiments, in operation 640, the network 299 may transmit an error response to the dummy invite message to the electronic device 101. For example, the IMS 210 may receive the error response to the dummy invite message from the network 299 via the CP 290. According to an embodiment the network 299 may ignore the dummy invite message. For example, the network 299 may fail to transmit any response to the dummy invite. In this case, operation 640 may be omitted.

According to various embodiments, in operation 645, the electronic device 101 may transmit an invite message (e.g., an SIP invite message) including the codec information determined in operation 635 to the network 299. According to an embodiment, the electronic device 101 may perform operation 645 when a specified time elapses (e.g., a specified timer expires) after transmitting the dummy invite message. For example, a timer of length different from the normal invite message may be set for the dummy invite message. According to an embodiment, the electronic device 101 may be configured to perform operation 645 when an error response is received from the network 299. According to an embodiment, the electronic device 101 may perform operation 645 independently of the error response.

Figure 8:
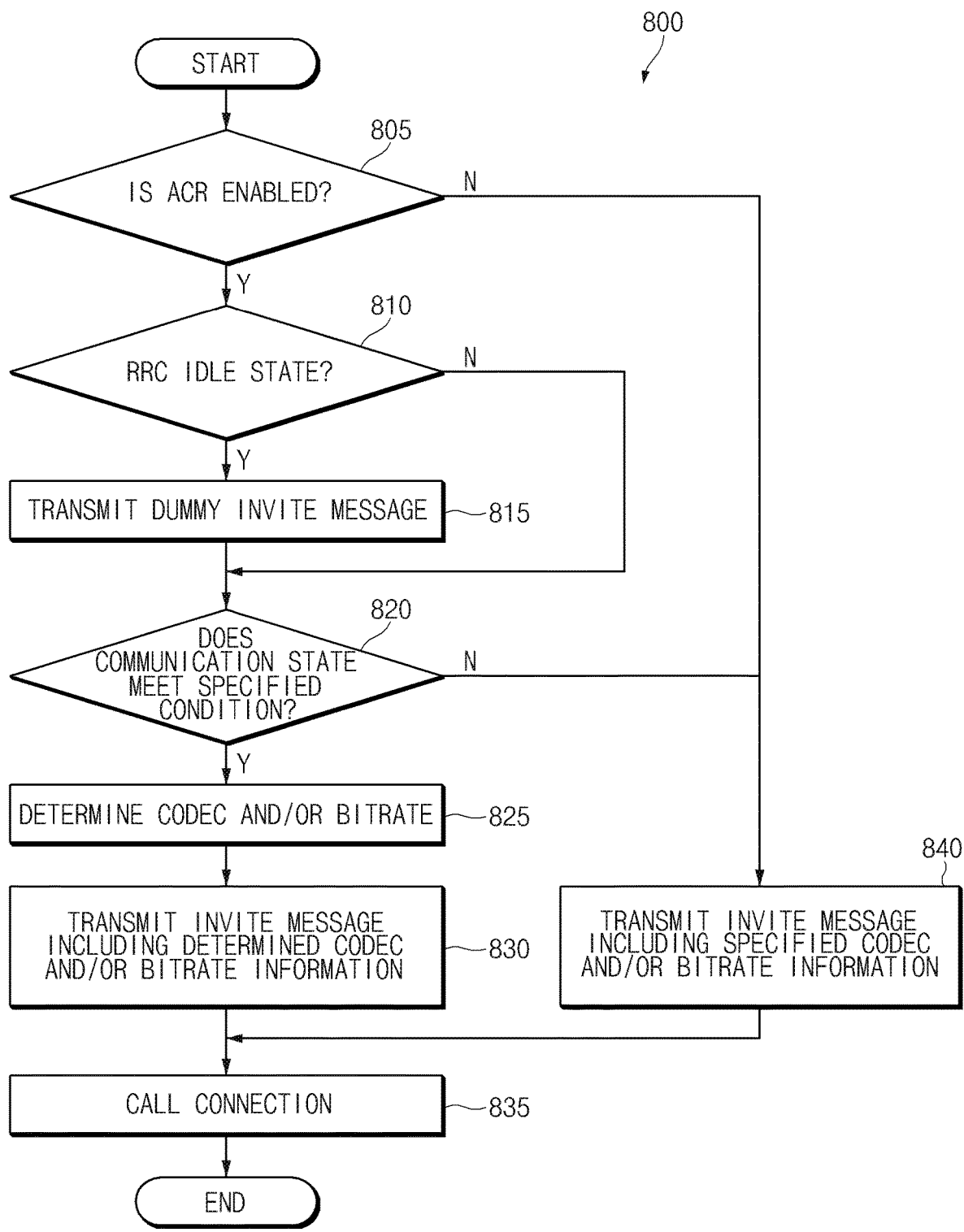
FIG. 8 is a flowchart of a method for controlling an adaptive codec rate in an electronic device according to various embodiments.

FIG. 8 is a flowchart illustrating a method 800 for controlling an adaptive codec rate in an electronic device 101 according to various embodiments.

Figure 9:
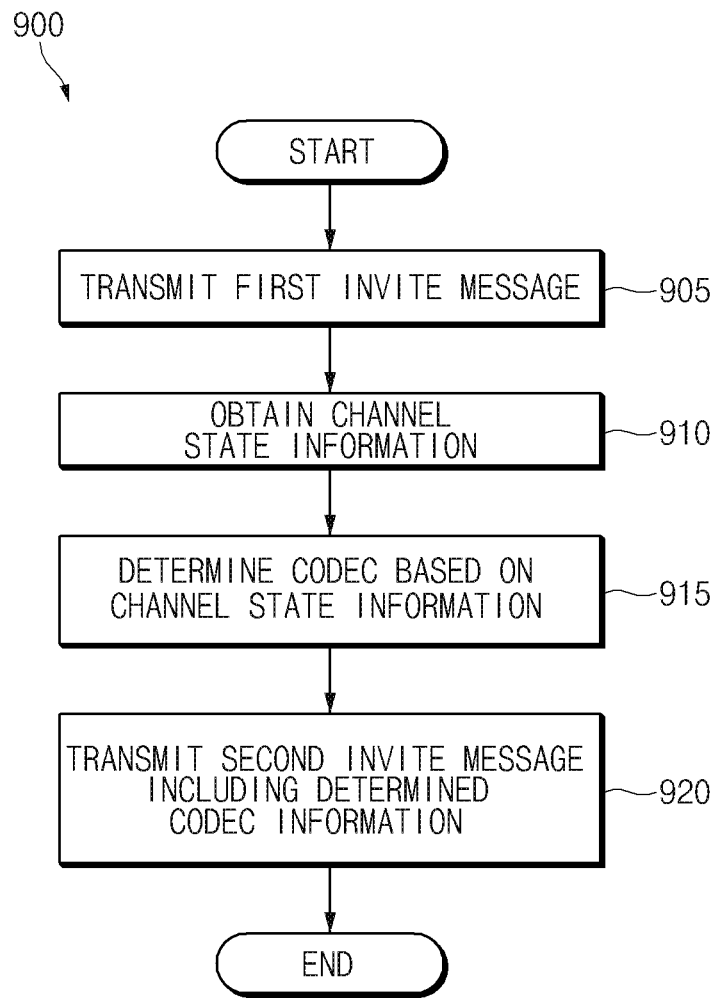
FIG. 9 is a flowchart of a method for controlling a codec based on channel state information in an electronic device according to various embodiments.

Referring to FIG. 9, in operation 805, a processor 120 of an electronic device (e.g., an electronic device 101 of FIG. 2) may determine whether to enable an adaptive codec rate (ACR). For example, as described above with reference to FIG. 3, the ACR may be enabled or disabled by the network 299 or the electronic device 101. When the ACR is disabled, a processor 120 may transmit an invite message (e.g., an SIP invite message) including type, bandwidth, FPS, resolution, and/or bitrate information of a specified codec to the network 299 using a communication module 190 depending on operation 840. For example, a type, a bandwidth, resolution, an FPS, and/or a bitrate of the specified codec may be a type, a bandwidth, resolution, an FPS, and/or a bitrate of a default codec. When the ACR is enabled, the processor 120 may perform operation 810.

According to various embodiments, in operation 810, the processor 120 may determine whether there is an RRC idle state. When in the RRC idle state, for example, the processor 120 may perform operation 815 to obtain channel state information and/or radio resource allocation information. When in an RRC connected state, for example, the processor 120 may omit operation 815.

According to various embodiments, in operation 815, the processor 120 may transmit a dummy invite message to the network 299 using the communication module 190. As described above with reference to FIG. 6, the dummy invite message may refer to an SIP invite message, at least one of mandatory fields of a header of which is omitted, or including at least one invalid value. For example, the dummy invite message may be referred to as an invite message for regeneration or retransmission of an invite message.

According to various embodiments, in operation 820, the processor 120 may determine whether the communication state meets a specified condition. According to an embodiment, the communication state may include an RSRP. For example, the specified condition may be an RSRP of less than a specified value. For example, the processor 120 may perform operation 825 when the RSRP is less than the specified value and may perform operation 840 when the RSRP is greater than or equal to the specified value. For example, the processor 120 may obtain a communication state using the communication module 190.

According to various embodiments, the processor 120 may determine whether the communication state and radio allocation information meet a specified condition. According to an embodiment, the processor 120 may perform operation 840 when the RSRP is greater than or equal to a specified first value and may determine whether the radio resource allocation information meets the specified condition when the RSRP is less than the specified first value. According to an embodiment, the processor 120 may perform operation 840 when the amount of granted uplink data indicated by the radio resource allocation information is greater than or equal to a specified second value. According to an embodiment, when the amount of granted uplink data indicated by the radio resource allocation information is less than the specified second value, the processor 120 may perform operation 825 or may determine whether a BLER and/or a transmit power meets the specified condition. According to an embodiment, when the BLER is greater than or equal to a specified third value or when the transmit power is greater than or equal to a specified fourth value, the processor 120 may perform operation 825. According to an embodiment, when the BLER is less than the specified third value or when the transmit power is less than the specified fourth value, the processor 120 may perform operation 840.

According to various embodiments, in operation 825, the processor 120 may determine a type, a bandwidth, resolution, an FPS, and/or a bitrate of a codec. For example, the processor 120 may determine a video codec and/or a voice codec. According to an embodiment, the processor 120 may determine a type (e.g., the specification of the codec), a bandwidth, an FPS, resolution, and/or a bitrate of the codec based on radio resource allocation information (e.g., an UL grant rate (e.g., the number of UL grants), an NRB, and/or an MCS) and/or channel state information (e.g., a BLER and/or a transmit power). The determination of the processor 120 for the type, the bandwidth, the FPS, the resolution, and/or the bitrate of the codec may refer to the description associated with operation 634 of FIG. 6.

According to various embodiments, in operation 830, the processor 120 may transmit an invite message (e.g., an SIP invite message) including the determined type, bandwidth, FPS, resolution, and/or bitrate information of the codec to the network 299 using the communication module 190. For example, the invite message may be generated by an IMS 210.

According to various embodiments, in operation 835, the processor 120 may perform a call (e.g., voice call or video call) connection. For example, the processor 120 may receive a response (e.g., SIP 200 OK) from the network 299 in response to operation 830 and may perform subsequent procedures to perform a call connection.

FIG. 9 is a flowchart 900 of a method for controlling a codec based on channel state information in an electronic device 101 according to various embodiments.

For example, it may be assumed that the electronic device 101 is in an RRC idle state. For example, it may be assumed that the electronic device 101 is in an ACR enabled state.

According to various embodiments, in operation 905, a processor 120 of an electronic device (e.g., an electronic device 101 of FIG. 2) may transmit a first invite message to a network 299 using a communication module 190. For example, the first invite message may be a message (e.g., a dummy invite message) for regeneration of a subsequent invite message.

According to various embodiments, in operation 910, the processor 120 may obtain channel state information using the communication module 190. For example, the channel state information may include an RSRP, a BLER, and/or a transmit power. According to an embodiment, the processor 120 may obtain channel state information by performing operation 905.

According to various embodiments, in operation 915, the processor 120 may determine a codec based on the channel state information. According to an embodiment, the processor 120 may determine a type (e.g., specification), a bandwidth, an FPS, resolution, and/or a bitrate of the codec based on the channel state information.

According to various embodiments, in operation 920, the processor 120 may transmit a second invite message (e.g., an SIP invite message) including the determined codec information (e.g., the type, the bandwidth, the resolution, the FPS, and/or the bitrate of the codec) to the network 299 using the communication module 190. For example, the processor 120 may perform operation 920 after a specified time elapses from operation 905. For example, when an error response to the first invite message is received from the network 299, the processor 120 may perform operation 920.

In the method for controlling the codec in the electronic device 101, operations 910 and 915 are described on the basis of the channel state information, but the method for controlling the codec is not limited thereto. As described above with reference to FIG. 6 and FIG. 8, the processor 120 may determine a codec based on channel state information and/or radio resource allocation information.

Referring again to FIG. 2, according to various embodiments, an electronic device 101 may include a communication circuitry (e.g., a communication module 190), a processor 120 operatively connected to the communication circuitry 190, and a memory 130 electrically connected to the processor 120. According to an embodiment, the memory 130 may store instructions, when executed, causing the processor 120 to transmit a first session initiation protocol (SIP) invite message including at least one dummy value to a network 299 using the communication circuitry 190, obtain channel state information using the communication circuitry 190, determine a codec for performing a packet based call based on the channel state information, and transmit a second SIP invite message including the determined codec information to the network 299 using the communication circuitry 190.

According to an embodiment, the packet based call may include a voice call or a video call. For example, the codec may include a voice codec and/or a video codec.

According to an embodiment, the channel state information may be obtained by the electronic device 101 by transmitting the first SIP invite message.

According to an embodiment, the first SIP invite message may have at least one of fields of a header, the at least one of the fields being composed of a dummy value.

According to an embodiment, the channel state information may include at least one of a reference signal received power, a block error rate, or a transmit power of the first SIP invite message.

According to an embodiment, the instructions may cause the processor 120 to receive radio resource allocation information for transmission of the first SIP invite message from the network 299 using the communication circuitry 190.

According to an embodiment, the instructions may cause the processor 120 to determine the codec for performing the packet based call based on the channel state information and the received radio resource allocation information.

According to an embodiment, the instructions may cause the processor 120 to transmit the second SIP invite message to the network 299, after a specified time elapses after transmitting the first SIP invite message or when an error response to the first SIP invite message is received from the network 299.

According to an embodiment, the instructions may cause the processor 120 to receive an open mobile alliance-device management (OMA-DM) message indicating to enable an adaptive codec rate setting from the network 299 using the communication circuitry 190. According to various embodiments, a method for controlling an adaptive codec rate in an electronic device 101 may include transmitting a first session initiation protocol (SIP) invite message including at least one dummy value to a network 299 using a communication circuitry 190 of the electronic device 101, obtaining channel state information using the communication circuitry 190, determining a codec for performing a packet based call based on the channel state information, and transmitting a second SIP invite message including the determined codec information to the network 299 using the communication circuitry 199.

According to an embodiment, the channel state information may be obtained by transmitting the first SIP invite message.

According to an embodiment, the first SIP invite message may have at least one of fields of a header, the at least one of the fields being composed of a dummy value.

According to an embodiment, the channel state information may include at least one of a reference signal received power, a block error rate, or a transmit power of the first SIP invite message.

According to an embodiment, the method for controlling the adaptive codec rate may further include receiving radio resource allocation information for transmission of the first SIP invite message from the network 299 using the communication circuitry 190.

According to an embodiment, the determining of the codec may include determining the codec for performing the packet based call based on the channel state information and the received radio resource allocation information.

According to an embodiment, the codec may include at least one of a voice codec or a video codec.

According to an embodiment, a computer-readable storage medium storing instructions executable by a processor may store the instructions, when executed, causing a processor 120 of an electronic device 101 to transmit a first session initiation protocol (SIP) invite message including at least one dummy value to a network 299 using a communication circuitry 190 of the electronic device 101, obtain channel state information using the communication circuitry 190, determine a codec for performing a packet based call based on the channel state information, and transmit a second SIP invite message including the determined codec information to the network 299 using the communication circuitry 190.

According to an embodiment, the channel state information may be obtained by transmitting the first SIP invite message.

According to an embodiment, the first SIP invite message may have at least one of fields of a header, the at least one of the fields being composed of a dummy value.

According to an embodiment, the channel state information may include at least one of a reference signal received power, a block error rate, or a transmit power of the first SIP invite message.

According to an embodiment, the instructions may cause the processor 120 to receive radio resource allocation information for transmission of the first SIP invite message from the network 299 using the communication circuitry 190.

The electronic device according to various embodiments may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

The invention claimed is:

1. An electronic device, comprising:
a communication circuitry;
a processor operatively connected to the communication circuitry; and
a memory electrically connected to the processor,
wherein the memory stores instructions, when executed, causing the processor to:
transmit a first session initiation protocol (SIP) invite message missing at least one mandatory field or including an invalid value for the at least one mandatory field to a network using the communication circuitry,
receive an error response for the first SIP invite message,
obtain channel state information based on the error response,
determine a codec for performing a packet based call based on the channel state information, and
transmit a second SIP invite message including the determined codec information to the network using the communication circuitry.

2. The electronic device of claim 1, wherein the at least one mandatory field is at least one of fields of a header of the first SIP invite message.

3. The electronic device of claim 1, wherein the channel state information includes at least one of a reference signal received power, a block error rate, or a transmit power of the first SIP invite message.

4. The electronic device of claim 1, wherein the instructions further cause the processor to:
receive radio resource allocation information for transmission of the first SIP invite message from the network using the communication circuitry.

5. The electronic device of claim 4, wherein the instructions further cause the processor to:
determine a voice codec for performing the packet based call based on the channel state information and the received radio resource allocation information.

6. The electronic device of claim 1, wherein the codec includes at least one of a voice codec or a video codec.

7. The electronic device of claim 1, wherein the instructions further cause the processor to:
receive an open mobile alliance-device management (OMA-DM) message indicating to enable an adaptive codec rate setting from the network using the communication circuitry.

8. A method for controlling an adaptive codec rate in an electronic device, the method comprising:
transmitting a first session initiation protocol (SIP) invite message missing at least one mandatory field or including an invalid value for the at least one mandatory field to a network using a communication circuitry of the electronic device;
receiving an error response for the first SIP invite message;
obtaining channel state information based on the error response;
determining a codec for performing a packet based call based on the channel state information; and
transmitting a second SIP invite message including the determined codec information to the network using the communication circuitry.

9. The method of claim 8, wherein the at least one mandatory field is at least one of fields of a header of the first SIP invite message.

10. The method of claim 8, wherein the channel state information includes at least one of a reference signal received power, a block error rate, or a transmit power of the first SIP invite message.

11. The method of claim 8, further comprising:
receiving radio resource allocation information for transmission of the first SIP invite message from the network using the communication circuitry.

12. The method of claim 11, wherein the determining of the codec includes determining the codec for performing the packet based call based on the channel state information and the received radio resource allocation information.

13. The method of claim 8, wherein the codec includes at least one of a voice codec or a video codec.

* * * * *